United States Patent [19]

Hazlett

[11] Patent Number: 4,845,873
[45] Date of Patent: Jul. 11, 1989

[54] ANIMAL DECOY WITH MOVABLE APPENDAGE

[76] Inventor: Stephen E. Hazlett, R.R. 1, Grandview, Ind. 47615

[21] Appl. No.: 189,233

[22] Filed: May 2, 1988

[51] Int. Cl.$^4$ .............................................. A01M 31/06
[52] U.S. Cl. .......................................... 43/3; 446/353
[58] Field of Search ............... 43/2, 3, 26.1, 26.2; 446/35, 338, 352, 353, 354, 384

[56] References Cited

U.S. PATENT DOCUMENTS

| | | | |
|---|---|---|---|
| 547,553 | 10/1895 | Keller | 43/3 |
| 2,013,709 | 9/1935 | Boissoneau | 43/3 |
| 2,480,390 | 8/1949 | Thompson | 43/3 |
| 2,570,778 | 10/1951 | DeVane | 446/354 |
| 2,575,252 | 11/1951 | Berger | 43/3 |
| 2,576,209 | 11/1951 | Berger | 43/3 |
| 2,835,064 | 5/1958 | Webb | 43/3 |

Primary Examiner—Nicholas P. Godici
Assistant Examiner—William S. Andes
Attorney, Agent, or Firm—Woodard, Emhardt, Naughton Moriarty & McNett

[57] ABSTRACT

An animal decoy with a movable appendage. An electric motor is mounted atop a frame contained within a chamber formed by an animal main body shell. In one embodiment, a neck and head is pivotally mounted to the frame and driven in pivot fashion by a rod pivotally connecting the neck to the electric motor output. In another embodiment, a pair of wings are pivotally mounted atop a pair of supports fixedly secured to the frame. The distal ends of the wings are pivotally attached to the forward end of a rod having a back end offset, but connected to the rotatable output of an electric motor. The connecting rod extends through a control post which limits movement of the rod and directs the movement of the wings in a flapping fashion.

7 Claims, 5 Drawing Sheets

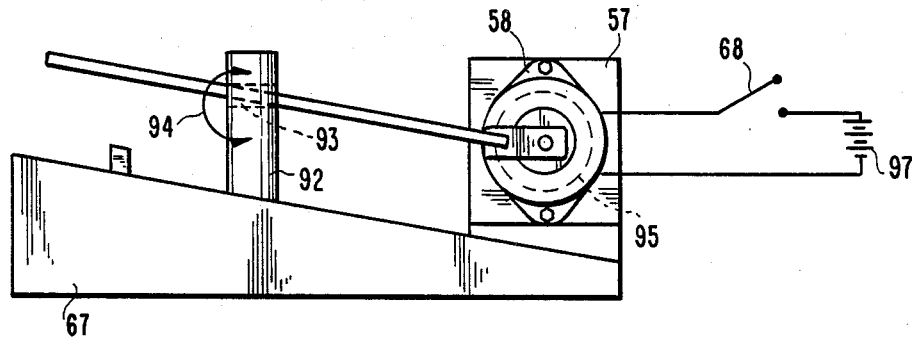
Fig.7
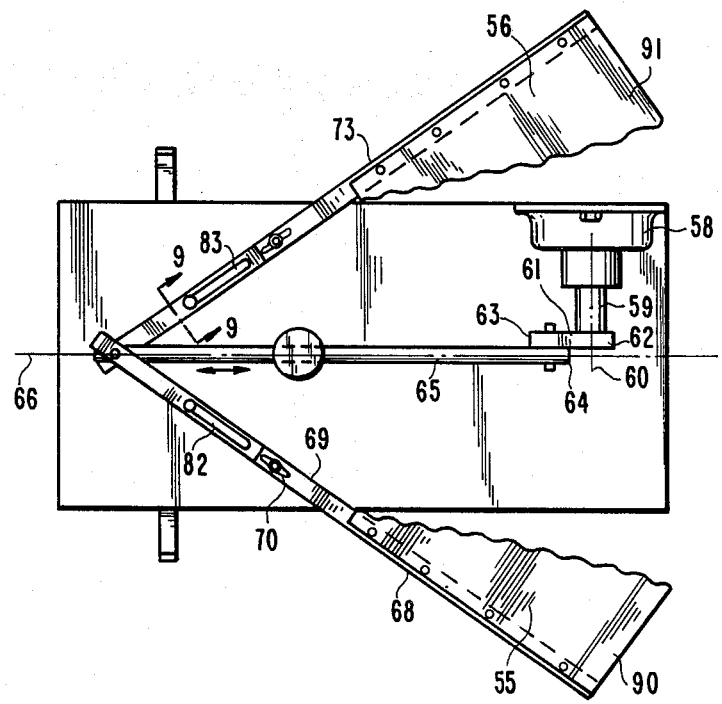
Fig.8
Fig.9
Fig.11

ANIMAL DECOY WITH MOVABLE APPENDAGE

BACKGROUND OF THE INVENTION

This invention is in the field of simulated animal decoys used in the sport of hunting.

Ducks and geese fly at a sufficient altitude out of the accurate range of the hunter's gun. Thus, the hunter will typically position a number of decoys in a nearby lake or field to attract the game. The decoys are commercially available and have the size and appearance of a duck or goose, except that the decoys are immovable. Of course, a real duck or goose will typically move its wings or head. Heretofore, decoys have not been available having movable wings or heads which simulate the movement of a real animal. Disclosed herein is such a decoy.

SUMMARY OF THE INVENTION

One embodiment of the present invention is an animal decoy comprising a frame with a longitudinal axis, a simulated animal body mounted to the frame and defining a chamber, an electric motor located within the chamber being connectable to a source of electrical energy and having a movable output, a simulated animal appendage movably mounted on the simulated animal body, and, connecting means extending within the chamber between the movable output and the simulated animal appendage and operable to move the simulated animal appendage when the electric motor is connected to a source of electrical energy.

Another embodiment of the present invention is an animal decoy with flappable wings for use in the sport of hunting comprising a frame with a longitudinal axis, a simulated animal body mounted to the frame and defining a chamber, an electric motor located within the chamber being connectable to a source of electrical energy and having a movable output, a simulated animal appendage movably mounted on the simulated animal body, the animal appendage including a first wing and a second wing each with a proximal end located in the chamber, connecting means extending within the chamber between the movable output and the first wing and the second wing and operable to move the first wing and the second wing when the electric motor is connected to a source of electrical energy, movement control means mounted to the frame and operably associated with the first wing, the second wing and the connecting means and operable to direct movement of the first wing and the second wing in flapping unison, and, on/off switch means connected between the electric motor and the source of electrical energy with the switch means being located remotely from the animal decoy allowing remote control of the animal decoy.

Yet another embodiment of the present invention is an animal decoy with a pivoting neck and head for use in the sport of hunting comprising a frame with a longitudinal axis, a simulated animal body mounted to the frame and defining a chamber, an electric motor located within the chamber being connectable to a source of electrical energy and having a movable output, a simulated animal appendage movably mounted on the simulated animal body, the animal appendage including an animal neck with animal head pivotally mounted on the frame, connecting means extending within the chamber between the movable ouptut and the animal neck to move the animal neck when the electric motor is connected to a source of electrical energy, the connecting means is connected to the neck and the movable output and is operable to pivot the neck and the head through a predetermined angle about a vertical pivot axis in cyclic fashion, and, on/off switch means connected between the electric motor and the source of electrical energy with the switch means being located remotely from the animal decoy allowing remote control of the animal decoy.

It is an object of the present invention to provide an animal decoy for use in the sport of hunting having a movable appendage.

A further object of the present invention is to provide an animal decoy with flappable wings for use in the sport of hunting.

A further object of the present invention is to provide an animal decoy with a pivoting neck and head for use in the sport of hunting.

Related objects and advantages of the present invention will be apparent from the following description.

BRIEF DESCRIPTION OF THE DRAWINGS

FIG. 7 is a side view of the decoy of FIG. 5 with the outer animal main body shell and neck removed therefrom.

FIG. 8 is a top view of the frame of FIG. 7.

FIG. 9 is a fragmentary enlarged cross-sectional view taken along the line 9—9 of FIG. 8 and viewed in the direction of the arrows.

FIG. 11 is a schematic representation of the movement of the wings.

DESCRIPTION OF THE PREFERRED EMBODIMENTS

Figure 1:
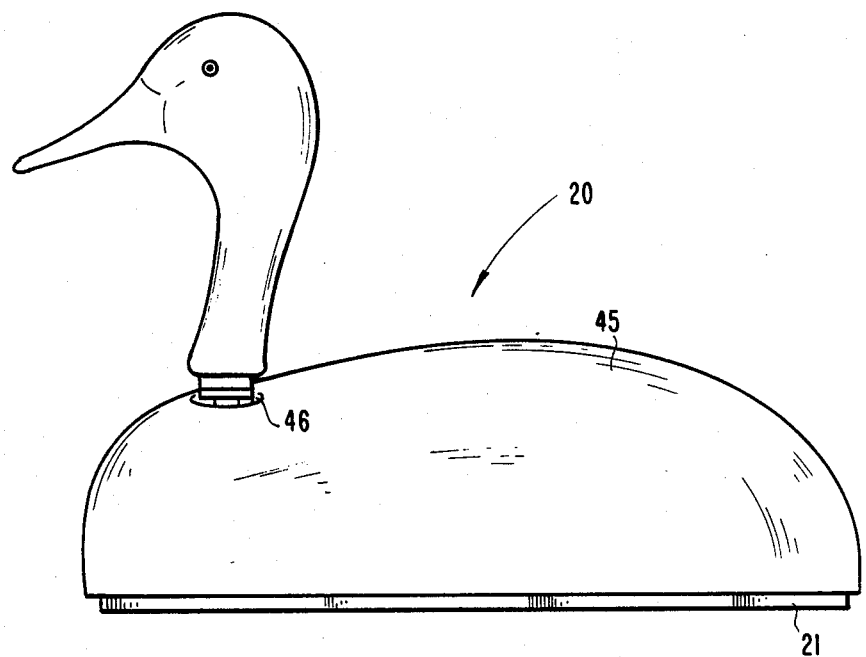
FIG. 1 is a side view of an animal decoy having a pivotable head.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIGS. 1-4 of the preferred embodiment show a animal decoy simulating a duck or a goose which has a pivoting head. FIGS. 5-11 show an animal decoy simulating a duck or a goose having flapping wings. Decoy 20 (FIG. 1) has a main frame 21 with a longitudinal axis 22 (FIG. 3) extending the length thereof. Fixedly mounted atop frame 21 is a conventional electric motor 23 connected to a source of electrical energy such as a battery 24 with a conventional switch 25 located therebetween to connect and disconnect the battery with respect to the motor. Motor 23 has a movable or rotatable output 26 having a vertical axis of rotation 27. The movable output 26 of the electric motor has a sufficient outside diameter to allow a link 28 to be rotatably mounted by a conventional fastener 29 offset from the axis 27. The opposite end of link 28 is pivotally mounted by a conventional fastening device 30 to the back end 31 of connecting rod 32.

An upright post 33 is fixedly mounted to the forward end of frame 21 and pivotally receives the simulated neck 34 and head 35 of the decoy. A Z-shaped bracket 36 (FIG. 4) has an inner end 37 fixedly secured to a shaft 38 pivotally mounted by conventional bearings atop post 33. The top end 39 of shaft 38 is fixedly connected to plate 40 in turn connected by conventional fastening devices 41 to the bottom plate shaped end 42 of the neck. The distal end 43 of bracket 36 is pivotally connected to the forward end 44 of rod 32. Distal end 43 is offset downwardly from end 37 thereby allowing rod 32 to be located a greater distance downward from the bottom end of the animal neck preventing interference with the animal main body shell 45 which is removably mounted to frame 21. Shell 45 has an interior chamber formed between the shell and frame 21 with the electric motor and rod 32 being located within the chamber. A hole 46 is formed in the forward end of shell 45 to allow a portion of shaft 38 to extend outwardly therefrom facilitating removal of fasteners 41 and disassembly of the neck and bracket 36 from the post 33 with the shell 45 then being removable from the frame. The top end 39 of shaft 38 locates the neck and head above the animal main body shell 45. Conventional fastening devices are utilized to secure the bottom edge portion of the shell to frame 21.

The on-off switch 25 may be located remotely from the animal decoy allowing remote control of the motion of the neck and head. Once switch 25 is closed, link 28 moves continuously around axis 27 thereby reciprocating rod 32 backward and forward along longitudinal axis 22 and pivoting the animal neck and head back and forth in the direction of double-headed arrow 47 about pivot axis 48 in cyclic fashion.

Animal decoy 50 (FIG. 5) has a shell 51 and an animal neck and head 52 fixedly secured thereto. A pair of apertures 53 and 54 are formed in shell 51 and respectively allow the proximal ends of wings 55 and 56 to extend into the interior chamber formed by shell 51 to be driven in flapping fashion.

Shell 51 is removably mounted atop frame 67 (FIG. 7) and includes a plurality of conventional fasteners removably securing the lower edge portion of the shell to the frame. An upright wall 57 is cantileveredly mounted atop frame 67 and has a conventional electric motor 58 mounted thereon. Motor 58 has a rotatable output 59 with a horizontally extending axis of rotation 60. A link 61 has a proximal end 62 fixedly secured to output 59 and rotates therewith. The opposite distal end 63 of the link is pivotally connected to the back end 64 of connecting rod 65. Rod 65 extends along the longitudinal axis 66 of frame 67.

The electric motor 58 and connecting rod 65 are located within the chamber formed between shell 51 and frame 67 with the electric motor being connected to a conventional source of electrical energy such as a battery 97. An on-off switch 68 located remotely from the decoy is connected between the battery and electric motor to allow for remote control of the movement of wings 55 and 56.

Wing 55 has a rigid member 68 with a proximal end 69 attached by means of a wing nut and fastener 70 to the outer end 75 of wing bracket 76. Likewise, wing 56 has a rigid member 73 connected by means of a wing nut and fastener 74 to the outer end 71 of wing bracket 72. Wing brackets 72 and 76 extend through apertures 54 and 53 with the inner ends 77 and 78 of the wing brackets being pivotally attached by means of a connecting pin 79 to the forward end of rod 65.

A pair of upright supports 80 and 81 are fixedly mounted atop frame 67 and have reduced diametered top ends to extend slidingly through respective slots 83 and 82 formed in wing brackets 72 and 76. The top end of support 80 and wing bracket 72 will now be described, it being understood that a similar description applies to the top end of support 81 and wing bracket 76. Support 80 has a reduced diametered top end 84 extending through slot 83 of wing bracket 72. A first washer 85 is positioned atop support 80 and beneath wing bracket 72 with a corresponding washer 86 being provided on the post atop the wing bracket. A helical spring 87 is located atop washer 86 on the post with a third washer 88 being located atop the helical spring. A cotter pin 89 extends through the top end 84 of the support thereby slightly compressing the helical spring between washers 86 and 88. As post 65 reciprocates along longitudinal axis 66, wing bracket 72 and the attached wing move in flapping cyclical fashion with bracket 72 moving atop the support as the wing bracket moves along the support the length of slot 83. The inner end 77 of bracket 72 is located beneath rod 65 whereas the top end 78 of wing bracket 76 is located immediately atop rod 65. A pair of flexible rubber sheets 90 and 91 are respectively attached to the rigid members 68 and 73 simulating the animal wing. The wing nut and fastener combinations 70 and 74 are located outwardly of shell 51 to allow for ease of removal of the wings without the necessity of removing the animal shell from the frame.

Movement control means including a guide post 92 is fixedly mounted to frame 67 with the post having an aperture 93 extending therethrough and having an inside diameter larger than rod 65. As link 61 is rotated about axis 60, rod 65 will pivot about a horizontal axis in th direction of double-headed arrow 94. This is true since the back end 64 of rod 65 is offset from axis 60 thereby causing end 64 of the rod to move in a circle 95 about axis 60. The horizontal axis of rotation 60 is located at an elevation lower than aperture 93. On the other hand, the forward end of rod 65 is connected to the wing brackets at an elevation higher than axis 60. Aperture 93 is of a sufficiently small diameter to constrain vertical movement of rod 65 resulting in the forward end of rod 65 moving upward as the back end 64 of the connecting rod moves downward and vice versa. Thus, the connecting rod pivots about a horizontal axis at the location of post 92. This pivoting motion can be increased by mounting post 90 closer to motor 58. Such pivotal motion of the connecting rod and the reciprocation of the rod 65 and the back and forth movement along axis 66 causes the wings to simulate movement of the wings of a stretching duck or a goose. For example, with the output 59 of electrical motor 58 rotating clockwise as viewed in FIG. 7, and with the back end 64 of the connecting rod moving up and rearward along axis 66, the forward end of the connecting rod will pivot downward causing both wings to pivot about supports 80 and 81, and about the forward end of the connecting rod. As the connecting rod forward end moves downward and rearward along with the ends 77 and 78 of wing brackets 72 and 76, the outer tips of the wings will move forward and upward in the direction of arrow 98 (FIG. 11). Once the connecting rod has reached its most rearward position, the back end 64 of the rod will move downward and forward causing the front end of the connecting rod to move forward and upward thereby again pivoting the wings and causing the outer tips of the wings to move downward and rearward in the direction of arrow 99. The helical springs mounted atop posts 80 and 81 are yieldable to allow the wing brackets to slide along the length of slots 82 and 83 and also allow the pivotal motion of the wings as the inner ends 77 and 78 of the wing brackets are first pulled back and downward and then pushed forward and upward in flapping fashion.

Figure 2:
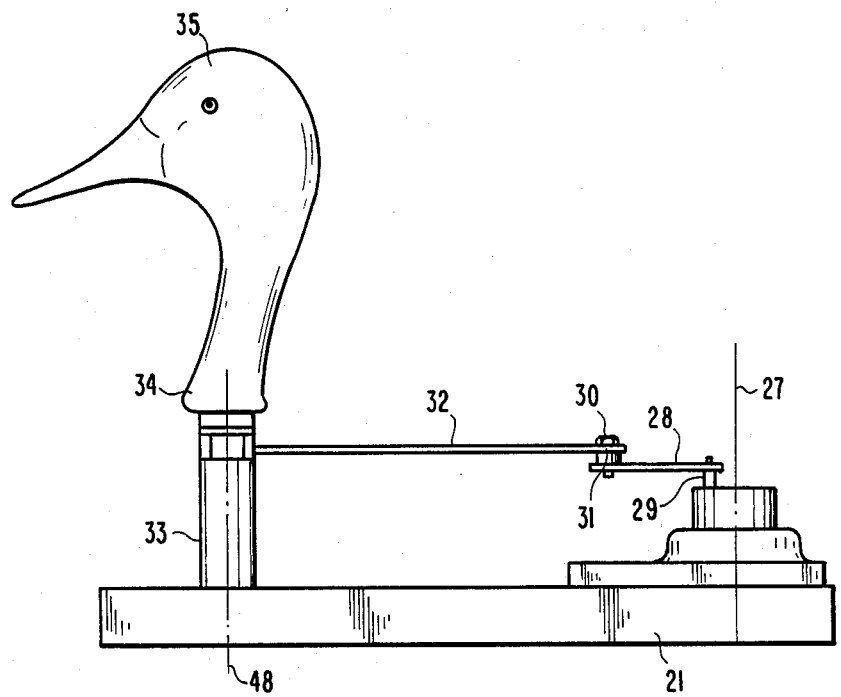
FIG. 2 is the same view as FIG. 1 only with the outer animal main body shell removed from the frame.
Figure 3:
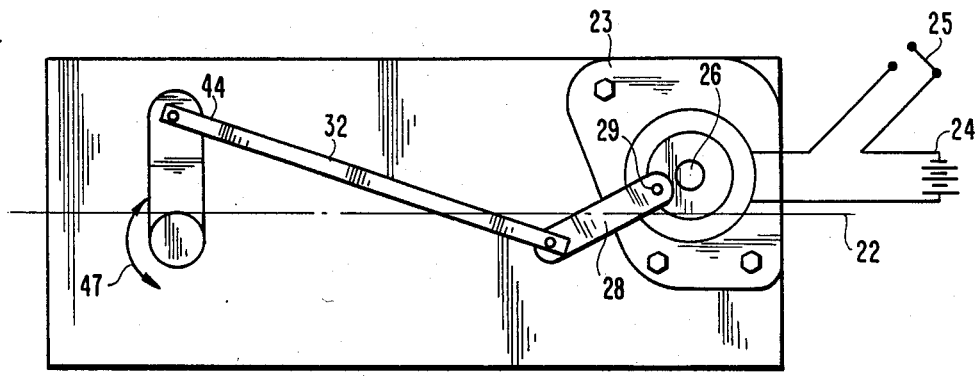
FIG. 3 is a top view of the frame of FIG. 2 with the neck and head removed.
Figure 4:
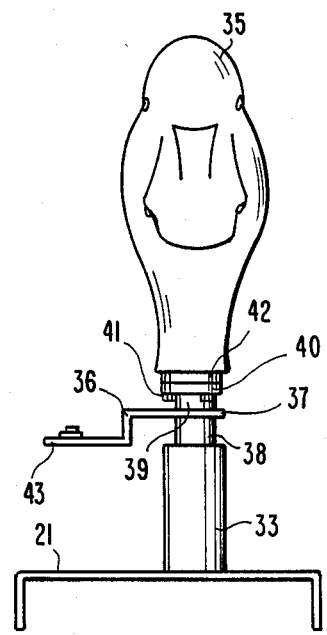
FIG. 4 is a left-hand, end view of the frame of FIG. 2.
Figure 5:
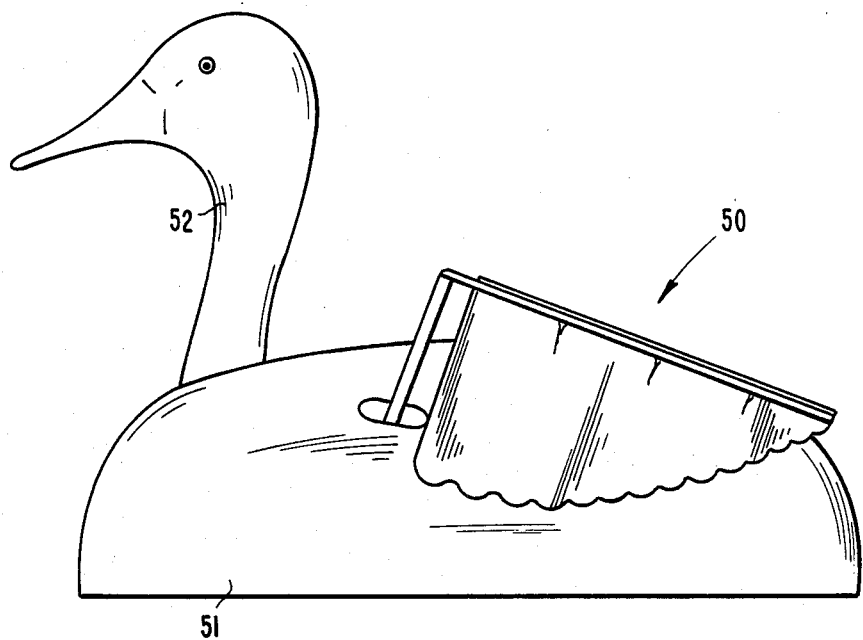
FIG. 5 is a side view of an animal decoy having a pair of flappable wings.
Figure 6:
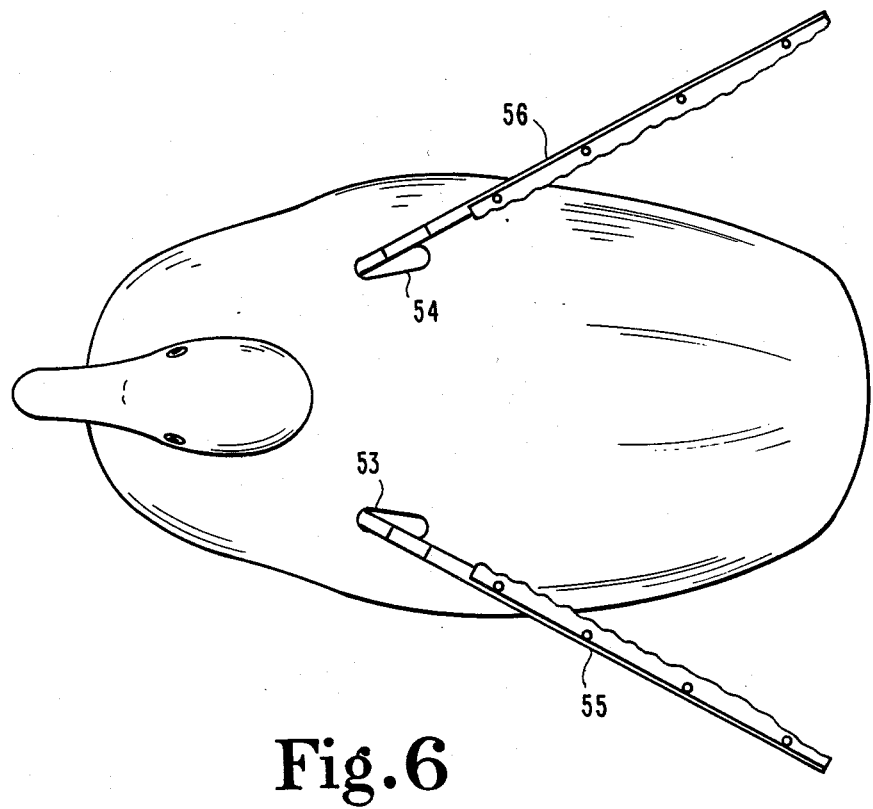
FIG. 6 is a top view of the decoy of FIG. 5.
Figure 10:
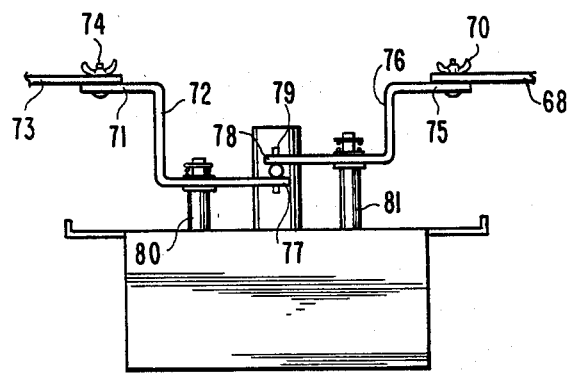
FIG. 10 is a left-hand end view of the frame of FIG. 8.

Many variations are contemplated and included in the present invention. For example, the animal decoy in both embodiments is shown as having an upright neck and head; however, the invention also includes a neck and head shaped to position the head adjacent the ground to simulate a feeding animal. Likewise, the neck is shown in FIG. 2 as pivoting about a vertical axis whereas the motor output rotates about a vertical axis; however, the invention also includes pivoting the neck about a horizontal axis with the motor output having a horizontal axis of rotation. In the latter alternative, the connecting rod is connected offset to the motor output and to the bottom end of the neck at a location below the horizontal pivot axis of the neck.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An animal decoy comprising:
    a frame with a longitudinal axis;
    a simulated animal body mounted to said frame and defining a chamber;
    an electric motor located within said chamber being connectable to a source of electrical energy and having a movable output;
    a simulated animal appendage movably mounted on said simulated animal body;
    connecting means extending within said chamber between said movable output and said simulated animal appendage and operable to move said simulated animal appendage when said electric motor is connected to a source of electrical energy; and wherein:
    said animal appendage includes a first wing and a second wing each with a proximal end located in said chamber, and further comprising:
    movement control means mounted to said frame and operably associated with said first wing, said second wing and said connecting means and operable to direct movement of said first wing and said second wing in flapping unison; and,
    said movement control means includes a post fixed to said frame with said post having an aperture, said connecting means includes a connector and a reciprocating rod with said rod having a forward end connected to said proximal end of said first wing and said second wing and having a back end connected to said movable output by said connector about a horizontally extending axis of rotation, said rod extending through said aperture at an elevation differing from said horizontal axis of rotation pivoting said rod about said post in a vertical direction as said rod reciprocates moving said forward end back and forth along said longitudinal axis as well as vertically.

2. The animal decoy of claim 1 wherein:
    said movement control means further includes a first support and a second support fixed to said frame, said first wing and said second wing are slidably mounted atop and supported respectively by said first support and said second support forward of said post, said movement control means being operable to control said first wing and said second wing to a movement in unison first forward in an upward direction and then rearward in a downward direction repeating said movement for each complete reciprocation of said rod.

3. The animal decoy of claim 2 and further comprising:
    fastening means removably mounting said first wing and said second wing to said frame.

4. The animal decoy of claim 3 wherein:
    said first wing and said second wing each include a rigid member extending lengthwise thereon and further include a rubber sheet attached to said rigid member simulating a wing.

5. An animal decoy with flappable wings for use in the sport of hunting comprising:
    a frame with a longitudinal axis;
    a simulated animal body mounted to said frame and defining a chamber;
    an electric motor located within said chamber being connectable to a source of electrical energy and having a movable output;
    a simulated animal appendage movably mounted on said simulated animal body, said animal appendage including a first wing and a second wing each with a proximal end;
    connecting means extending within said chamber between said movable output and said first wing and said second wing and operable to move said first wing and said second wing when said electric motor is connected to a source of electrical energy; and,
    movement control means mounted to said frame and operably associated with said first wing, said second wing and said connecting means and operable to direct movement of said first wing and said second wing in flapping unison, said movement control means including a guide with said connecting means including a connector and a reciprocating link, said reciprocating link having a forward portion connected to said proximal end of said first wing and said second wing and having a back end portion connected to said movable output by said connector about a horizontally extending axis of rotation, said link entending through said guide at an elevation differing from said horizontal axis of rotation pivoting said link about said guide in a vertical direction as said link reciprocates moving said forward portion and back end portion back and forth along said longitudinal axis as well as vertically.

6. An animal decoy with flappable wings for use in the sport of hunting comprising:
a frame with a longitudinal axis;
a simulated animal body mounted to said frame and defining a chamber;
an electric motor located within said chamber being connectable to a source of electrical energy and having a movable output;
a simulated animal appendage movably mounted on said simulated animal body, said animal appendage including a first wing and a second wing each with a proximal end located in said chamber;
connecting means extending within said chamber between said movable output and said first wing and said second wing and operable to move said first wing and said second wing when said electric motor is connected to a source of electrical energy;
movement control means mounted to said frame and operably associated with said first wing, said second wing and said connecting means and operable to direct movement of said first wing and said second wing in flapping unison; and,
on/off switch means connected between said electric motor and said source of electrical energy with said switch means being located remotely from said animal decoy allowing remote control of the animal decoy; and wherein:
said movement control means includes a post fixed to said frame with said post having an aperture, said connecting means includes a connector and a reciprocating rod with said rod having a forward end connected to said proximal end of said first wing and said second wing and having a back end connected to said movable output by said connector about a horizontally extending axis of rotation, said rod extending through said aperture at an elevation differing from said horizontal axis of rotation pivoting said rod about said post in a vertical direction as said rod reciprocates moving said forward end back and forth along said longitudinal axis as well as vertically.

7. The animal decoy of claim 6 wherein:
said movement control means further includes a first support and a second support fixed to said frame, said first wing and said second wing are slidably mounted atop and supported respectively by said first support and said second support forward of said post, said movement control means being operable to control said first wing and said second wing to a movement in unison first forward in an upward direction and then rearward in a downward direction repeating said movement for each complete reciprocation of said rod.

* * * * *